US012668990B2

(12) United States Patent
Glaser

(10) Patent No.: US 12,668,990 B2
(45) **Date of Patent: *Jun. 30, 2026**

(54) CABINETRY HANDLE

(71) Applicant: LIBERTY HARDWARE MFG. CORP., Winston-Salem, NC (US)

(72) Inventor: Michael Glaser, Winston-Salem, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/911,773

(22) Filed: Oct. 10, 2024

(65) Prior Publication Data

US 2025/0034904 A1 Jan. 30, 2025

Related U.S. Application Data

(63) Continuation of application No. 17/592,762, filed on Feb. 4, 2022, now Pat. No. 12,139,933.

(51) Int. Cl.
*E05B 1/00* (2006.01)
*A47B 95/02* (2006.01)

(52) U.S. Cl.
CPC ............ *E05B 1/0015* (2013.01); *A47B 95/02* (2013.01)

(58) Field of Classification Search
CPC . E05B 1/0015; A47B 95/02; A47B 2095/023; A47B 2095/024; A47B 2095/026; A47B 2095/028
USPC ............................................................ D8/308
See application file for complete search history.

(56) References Cited

U.S. PATENT DOCUMENTS 59,250 A * 10/1866 Myers .................... A47B 95/02 16/417
399,476 A * 3/1889 Berbecker .............. A47B 95/02 16/417
535,564 A * 3/1895 Tollner .................. A47B 95/02 16/417
729,351 A * 5/1903 Kade ...................... A47B 95/02 40/325

(Continued)

FOREIGN PATENT DOCUMENTS

DE 29701425 U1 5/1997

OTHER PUBLICATIONS

Franklin Brass Amazon, https://www.amazon.com/Franklin-Brass-P40825K-117-C-Asymmetric-Furniture/dp/B07PGBN8F2/?th=1, Mar. 11, 2019 (Year: 2019).*

(Continued)

*Primary Examiner* — Jeffrey O'Brien
(74) *Attorney, Agent, or Firm* — Brooks Kushman P.C.; Jeffrey Doyle

(57) ABSTRACT

A cabinetry handle is provided with a handle body with a mounting surface oriented on the handle body to mount to cabinetry. A first fastener is provided on the mounting surface to cooperate with a second fastener within the cabinetry. At least one projection is spaced apart from the first fastener and extends a length from the mounting surface to engage the cabinetry to minimize rotation of the handle body relative to the cabinetry. The at least one projection has a thickness and a width that is greater than the thickness. A direction of the width of the at least one projection is aligned with the first fastener.

19 Claims, 3 Drawing Sheets

(56) References Cited

U.S. PATENT DOCUMENTS

| | | | | | |
|---|---|---|---|---|---|
| 1,639,159 | A | * | 8/1927 | Anderson | F16K 27/062 174/165 |
| 2,095,397 | A | | 10/1937 | Overmyer | |
| 2,796,627 | A | * | 6/1957 | Heyer | E05B 1/0015 411/959 |
| 2,807,827 | A | * | 10/1957 | Brooks | E05B 1/0015 16/419 |
| 3,174,178 | A | * | 3/1965 | Dimmer | E05B 1/0015 D7/393 |
| 3,311,943 | A | * | 4/1967 | Budai | A47B 95/02 16/419 |
| 3,621,510 | A | | 11/1971 | Rollins, Jr. | |
| 4,638,529 | A | * | 1/1987 | Katona | F24C 15/024 126/190 |
| 5,255,413 | A | * | 10/1993 | Sabo | E05B 1/0015 16/DIG. 30 |
| 5,632,062 | A | * | 5/1997 | Katz | F24C 15/024 16/412 |
| D380,133 | S | * | 6/1997 | Rochette | D8/352 |
| 5,938,368 | A | * | 8/1999 | Anderson | E05B 1/0015 403/260 |
| 6,651,830 | B2 | | 11/2003 | Pan | |
| 7,007,347 | B2 | | 3/2006 | Roels | |
| 7,559,120 | B2 | | 7/2009 | Fujiwara et al. | |
| 7,798,486 | B2 | | 9/2010 | Hasegawa et al. | |
| 8,328,250 | B2 | | 12/2012 | Botten et al. | |
| 8,732,910 | B1 | | 5/2014 | Paul et al. | |
| 12,139,933 | B2 | * | 11/2024 | Glaser | E05B 1/0015 |
| 2003/0106185 | A1 | * | 6/2003 | Worrell | F24C 15/024 16/444 |
| 2006/0175496 | A1 | | 8/2006 | Lai | |

OTHER PUBLICATIONS

Canada Office Action for Application No. 3,186,379, dated Jan. 29, 2026, 5 pages.

* cited by examiner

CABINETRY HANDLE

CROSS-REFERENCE TO RELATED APPLICATIONS

This application is a continuation of U.S. application Ser. No. 17/592,762 filed Feb. 4, 2022, now U.S. Pat. No. 12,139,933 B2, the disclosure of which is hereby incorporated in its entirety by reference herein.

TECHNICAL FIELD

Various embodiments relate to handles for cabinetry.

BACKGROUND

The prior art has provided handles for cabinetry with pins to engage the cabinetry and minimize rotation of the handle relative to the cabinetry.

SUMMARY

According to an embodiment, a cabinetry handle is provided with a handle body with a mounting surface oriented on the handle body to mount to cabinetry. A first fastener is provided on the mounting surface to cooperate with a second fastener within the cabinetry. At least one projection is spaced apart from the first fastener and extends a length from the mounting surface to engage the cabinetry to minimize rotation of the handle body relative to the cabinetry. The at least one projection has a thickness and a width that is greater than the thickness. A direction of the width of the at least one projection is aligned with the first fastener.

According to a further embodiment, the at least one projection is further provided with a pair of projections, each spaced apart from the first fastener and extending the length from the mounting surface. Each of the pair of projections has the thickness and the width, and the direction of the width is aligned with the first fastener.

According to another further embodiment, the first fastener is further defined as an internally threaded aperture formed in the handle body and through the mounting surface.

According to an even further embodiment, the second fastener is an externally threaded fastener.

According to another further embodiment, the width of the at least one projection is tapered to reduce in width along the length of the projection away from the mounting surface.

According to another further embodiment, the thickness of the at least one projection is tapered to reduce in thickness along the length of the projection away from the mounting surface.

According to another further embodiment, a distal end of the at least one projection is provided with a flat surface generally parallel with the mounting surface.

According to another further embodiment, the handle body is provided with a post with the mounting surface provided on a proximal end of the post.

According to an even further embodiment, the handle body is further provided with a handle portion extending from a distal end of the post.

According to another even further embodiment, the handle portion is oriented perpendicular to the post.

According to another further embodiment, the handle portion extends asymmetrically from the post.

According to another further embodiment, the at least one projection extends radially outboard from the first fastener.

According to another further embodiment, the handle portion extends in a direction radially outboard from the first fastener.

According to another embodiment, a cabinetry handle is provided with a handle body with a mounting surface oriented on the handle body to mount to cabinetry. A first fastener is provided on the mounting surface to cooperate with a second fastener within the cabinetry. A pair of projections are each spaced apart from the first fastener and extend a length from the mounting surface to engage the cabinetry to minimize rotation of the handle body relative to the cabinetry. Each of the pair of projections has a thickness and a width that is greater than the thickness, and a direction of the width is aligned with the first fastener. The width of each of the pair of projections is tapered to reduce in width along the length of each projection away from the mounting surface. The thickness of each of the pair of projections is tapered to reduce in thickness along the length of each projection away from the mounting surface.

According to a further embodiment, the first fastener is further defined as an internally threaded aperture formed in the handle body and through the mounting surface.

According to an even further embodiment, the second fastener is an externally threaded fastener.

According to another further embodiment, a distal end of each of the pair of projections is provided with a flat surface generally parallel with the mounting surface.

According to another embodiment, a cabinetry handle is provided with a handle body with a mounting surface oriented on the handle body to mount to cabinetry. A first fastener is provided on the mounting surface to cooperate with a second fastener within the cabinetry. A pair of projections are each spaced apart from the first fastener and extend a length from the mounting surface to engage the cabinetry to minimize rotation of the handle body relative to the cabinetry. Each of the pair of projections has a thickness and a width that is greater than the thickness, and a direction of the width is aligned with the first fastener. The handle body is further provided with a post with the mounting surface provided on a proximal end of the post. The handle body is further provided with a handle portion extending from a distal end of the post. The handle portion is oriented perpendicular to the post. The handle portion extends asymmetrically from the post.

According to a further embodiment, the handle portion extends in a direction radially outboard from the first fastener.

According to another further embodiment, the width of each of the pair of projections is tapered to reduce in width along the length of each projection away from the mounting surface. The thickness of each of the pair of projections is tapered to reduce in thickness along the length of each projection away from the mounting surface.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
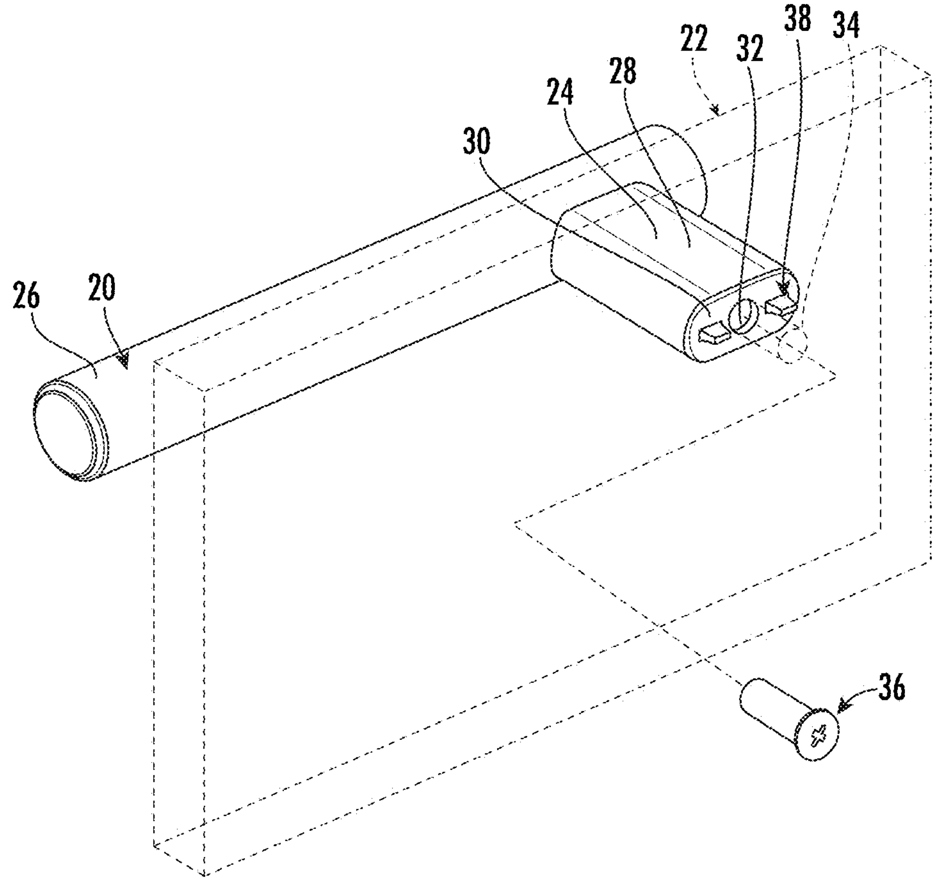
FIG. 1 is a rear perspective view of a cabinetry handle according to an embodiment, illustrated in cooperation with a cabinetry panel.
Figure 2:
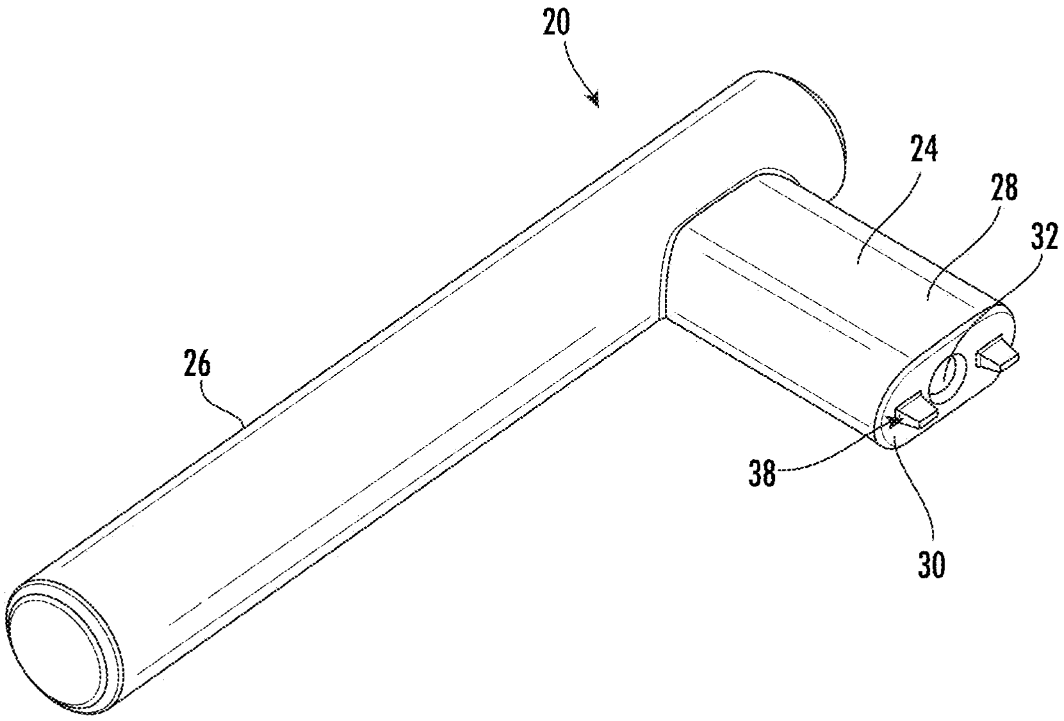
FIG. 2 is another rear perspective view of the cabinetry handle of FIG. 1.
Figure 3:
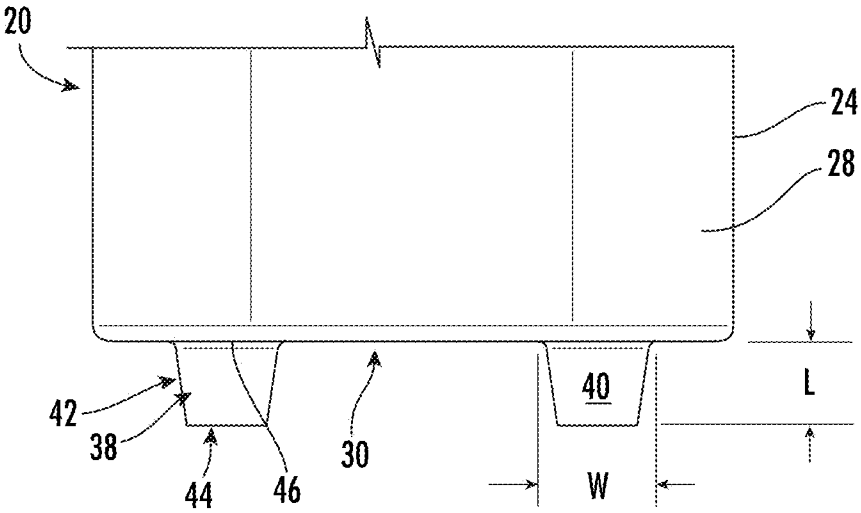
FIG. 3 is a top plan view of a mounting portion of the cabinetry handle of FIG. 1.

FIGS. 1 and 2 illustrate a cabinetry handle 20 according to an embodiment. The cabinetry handle 20 is illustrated during installation to a cabinetry panel 22 in FIG. 1. The cabinetry handle 20 can embody any handle arrangement. The depicted cabinetry handle 20 is illustrated as an L-handle, or L-knob, with a post 24, and a handle portion 26. The handle portion 26 extends perpendicular to the post 24. The handle portion 26 extends asymmetrically from the post 24, to be manually grasped from one lateral side of the post 24. Although the cabinetry handle 20 is illustrated as an L-knob, any cabinetry handle 20 may be employed, such as symmetrical knobs and asymmetrical knobs.

The cabinetry handle 20 includes a body 28, which defines the post 24. A mounting surface 30 is provided on the proximal end of the post 24 to mount the cabinetry handle 20 to a front surface of the cabinetry panel 22. The cabinetry panel 22 may be a cabinetry door, or a cabinetry drawer front panel. The handle 20 permits a user to pivot or translate the panel 22, and consequently, the door or drawer.

The handle 20 is fastened to the cabinetry panel 22 with a first fastener 32. In the depicted embodiment, the first fastener 32 is an internally threaded aperture formed in the body 28 and through the mounting surface 30. The handle 20 may be formed from a structurally resilient material, such as a metallic alloy. Alternatively, the handle 20 may be formed from any suitable, structural, and ornamental material, with a body 28 insert to provide the mounting surface 30 and the first fastener 32.

A through aperture 34 is formed through the cabinetry panel 22. The threaded aperture 32 of the handle 20 is aligned with the through aperture 34. A second fastener 36 is provided as an externally threaded fastener 36. The second fastener 36 is installed within the cabinetry, on a rear surface of the cabinetry panel 22 to extend through the through aperture 34 in the panel 22 and to engage the threaded aperture 32 in the handle 20. The second fastener 36 fastens the threaded aperture 32 of the handle to the panel 22. Alternatively, the handle 20 may be provided with a threaded shaft as the first fastener 32, which may extend through the through aperture 34 in the panel to engage an internally threaded second fastener 36, according to another embodiment.

Cabinetry handles 20 that connect to panels 22 with one fastener pair 32, 36 through one aperture 34 may be susceptible to inadvertent rotation about the aperture 34. L-knob style handles 20 are even more susceptible to inadvertent rotation due to a moment applied upon the handle 20 due to a laterally offset force applied upon the handle portion 26.

Figure 4:
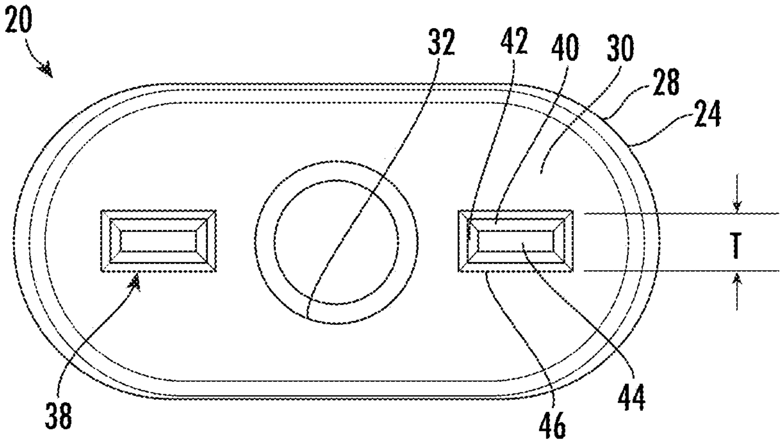
FIG. 4 is a rear elevation view of the mounting portion of the cabinetry handle of FIG. 1.

Referring now to FIGS. 1-4, a pair of projections 38 extend from the mounting surface 30 to engage the front surface of the cabinetry panel 22 to resist rotation of the cabinetry handle 20 relative to the panel 22. The projections 38 are spaced about the threaded aperture 32 to enhance leverage potential of the projections 38 relative to the first fastener 32. The projections 38 extend a length 'L' (labeled in FIG. 3) from the mounting surface 30. The projections 38 have a thickness 'T' (labeled in FIG. 4), and a width 'W' (labeled) in FIG. 2. The width 'W' is greater than the thickness 'T'. The width 'W' direction of the projections 38 are aligned with the threaded aperture, as illustrated in FIG. 4.

The width 'W' of each projection 38 is tapered to reduce in width 'W' along the length 'L' of each projection 38, away from the mounting surface 30. The thickness 'T' of each projection 38 is also tapered to reduce in thickness 'T' along the length 'L' of the projection 38 away from the mounting surface 30.

The shape and orientation of the projections 38 perform as teeth to provide a large surface area 40 across the width 'W' and length 'L', which rotational loads can be distributed. The thin wedge-like geometry 42 of the thickness 'T' allows the projections 38 to penetrate or bite into the cabinet or drawer face panel 22 when the handle 20 is installed. The large surface area 40 across the width 'W' and length 'L' of the projections 38, is in contact with the cabinetry panel 22 and oriented to resist rotational loads.

The projections 38 are located on the mounting surface 30 of the cabinet knob 20. There are two projections 38, one projection 38 on each side of the mounting aperture 32. The projections 38 are oriented such that the width 'W' dimension of each projection 38 falls in the same plane, which also passes through the center of the mounting aperture 32. In other words, the width 'W' direction of the projections 38 extends radially outboard from the threaded aperture 32. The handle portion 26 in the depicted embodiment, also extends radially outboard from the threaded aperture 32.

When the handle 20 is installed on the panel 22, the projections 38 penetrate into the material of the cabinetry panel 22, as the fastener 36 is tightened. A correctly installed and fully fastened handle 20 aligns the mounting surface 30 flush with the front surface of the cabinetry panel 22, with the projections 38 fully inserted into the front face of the cabinetry panel 22. The wide surfaces 40 of the projections 38 help counter rotational forces that are perpendicular to the cabinet or drawer face of the panel 22.

The anti-rotational projections 38 provide an advantage over conventional (conical) anti-rotational pins because the enlarged surface area 40 of the projections are oriented perpendicularly or near-perpendicularly to the rotational forces that the projections 38 resist. Each projection 38 also has a larger total surface area 40, 42 in comparison to a conical pin of the same length 'L'.

The projections 38 are tapered for piercing into the panel 22. The projections 38 include a flattened distal surface 44, which is parallel with the mounting surface 30, to avoid safety issues with an otherwise sharpened or pin design. A fillet or radius 46 is formed around each intersection of the large surface areas 40 and the mounting surface 30, and around each intersection of the thin edges 42 and the mounting surface 30. The fillets 46 minimize a stress concentration between the projections 38 and the mounting surface 30.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cabinetry handle comprising:

a handle body with a mounting surface oriented on the handle body to mount to cabinetry, wherein a first fastener is provided on the mounting surface to cooperate with a second fastener within the cabinetry; and at least one projection spaced apart from the first fastener and extending a length from the mounting surface to engage the cabinetry to minimize rotation of the handle body relative to the cabinetry, wherein the at least one projection has a thickness and a width that is greater than the thickness, and the width is aligned in a direction toward the first fastener; and wherein the width and the length of the at least one projection provides an enlarged surface area, oriented perpendicularly or near-perpendicularly to rotation that the at least one projection resists.

2. The cabinetry handle of claim 1 wherein the at least one projection further comprises a pair of projections, each spaced apart from the first fastener and extending the length from the mounting surface, each having the thickness and the width, and the direction of the width is aligned with the first fastener.

3. The cabinetry handle of claim 1 wherein the first fastener is further defined as an internally threaded aperture formed in the handle body and through the mounting surface; and wherein the cabinetry handle further comprises the second fastener as an externally threaded fastener.

4. The cabinetry handle of claim 1 wherein the width of the at least one projection is tapered to reduce in width along the length of the projection away from the mounting surface; and wherein the thickness of the at least one projection is tapered to reduce in thickness along the length of the projection away from the mounting surface.

5. The cabinetry handle of claim 1 wherein a distal end of the at least one projection is provided with a flat surface parallel with the mounting surface to penetrate into the cabinetry.

6. The cabinetry handle of claim 1 wherein the handle body comprises a post with the mounting surface provided on a proximal end of the post.

7. The cabinetry handle of claim 6 wherein the handle body further comprises a handle portion extending from a distal end of the post.

8. The cabinetry handle of claim 7 wherein the handle portion is oriented perpendicular to the post.

9. The cabinetry handle of claim 7 wherein the handle portion extends asymmetrically from the post.

10. The cabinetry handle of claim 7 wherein the at least one projection extends radially outboard from the first fastener.

11. The cabinetry handle of claim 7 wherein the handle portion extends in a direction radially outboard from the first fastener.

12. The cabinetry handle of claim 1 wherein a fillet or radius is formed around each intersection of the enlarged surface area and the mounting surface to minimize a stress concentration between the at least one projection and the mounting surface.

13. The cabinetry handle of claim 12 wherein the thickness and the length of the at least one projection provide a thin surface area; and wherein a fillet or radius is formed around each intersection of the thin surface area and the mounting surface to minimize a stress concentration between the at least one projection and the mounting surface.

14. A cabinetry handle comprising:

a handle body with a mounting surface oriented on the handle body to mount to cabinetry, wherein a first fastener is provided on the mounting surface to cooperate with a second fastener within the cabinetry; and a pair of projections, each spaced apart from the first fastener and extending a length from the mounting surface to engage the cabinetry to minimize rotation of the handle body relative to the cabinetry, wherein each of the pair of projections has a thickness and a width that is greater than the thickness, and the width is aligned in a direction toward the first fastener;

wherein the width of each of the pair of projections is tapered to reduce in width along the length of each projection away from the mounting surface;

wherein the thickness of each of the pair of projections is tapered to reduce in thickness along the length of each projection away from the mounting surface; and wherein the width and the length of each of the pair of projections provides an enlarged surface area, oriented perpendicularly or near-perpendicularly to rotation that the pair of projections resists.

15. The cabinetry handle of claim 14 wherein the first fastener is further defined as an internally threaded aperture formed in the handle body and through the mounting surface; and wherein the cabinetry handle further comprises the second fastener as an externally threaded fastener.

16. The cabinetry handle of claim 14 wherein a distal end of each of the pair of projections is provided with a flat surface parallel with the mounting surface to penetrate into the cabinetry.

17. A cabinetry handle comprising:

a handle body with a mounting surface oriented on the handle body to mount to cabinetry, wherein a first fastener is provided on the mounting surface to cooperate with a second fastener within the cabinetry; and a pair of projections, each spaced apart from the first fastener and extending a length from the mounting surface to engage the cabinetry to minimize rotation of the handle body relative to the cabinetry, wherein each of the pair of projections has a thickness and a width that is greater than the thickness, and the width is aligned in a direction toward the first fastener;

wherein the handle body comprises a post with the mounting surface provided on a proximal end of the post;

wherein the handle body further comprises a handle portion extending from a distal end of the post;

wherein the handle portion is oriented perpendicular to the post;

wherein the handle portion extends asymmetrically from the post; and wherein the width and the length of each of the pair of projections provides an enlarged surface area, oriented perpendicularly or near-perpendicularly to rotation that the pair of projections resists.

18. The cabinetry handle of claim 17 wherein the handle portion extends in a direction radially outboard from the first fastener.

19. The cabinetry handle of claim 17 wherein the width of each of the pair of projections is tapered to reduce in width along the length of each projection away from the mounting surface; and wherein the thickness of each of the pair of projections is tapered to reduce in thickness along the length of each projection away from the mounting surface.

* * * * *